United States Patent [19]

Jäger

[11] 4,236,888
[45] Dec. 2, 1980

[54] HEAT EXCHANGER WITH PRELIMINARY CALCINING

[76] Inventor: Heinz Jäger, Nevelstr. 40, 4630 Bochum, Fed. Rep. of Germany

[21] Appl. No.: 940,575

[22] Filed: Sep. 8, 1978

[30] Foreign Application Priority Data

Sep. 14, 1977 [DE] Fed. Rep. of Germany ....... 2741307

[51] Int. Cl.³ .............................................. F27B 7/02
[52] U.S. Cl. ..................................... 432/106; 432/58
[58] Field of Search ................... 432/58, 106; 106/100

[56] References Cited

U.S. PATENT DOCUMENTS

| | | | |
|---|---|---|---|
| 3,975,148 | 8/1976 | Fukuda et al. | 432/106 |
| 4,071,310 | 1/1978 | Ghestem | 432/106 |
| 4,130,390 | 12/1978 | Kobayashi et al. | 432/106 |

Primary Examiner—John J. Camby
Attorney, Agent, or Firm—Herbert L. Lerner

[57] ABSTRACT

Heat exchanger for rotary kiln installations wherein cement klinker or the like is burned and wherein precalcining of raw dust or power is effected in the heat exchanger through supplying fuel thereto, includes a calcining device connectible in a riser pipeline extending from a rotary kiln to the heat exchanger directly above an inlet head of the rotary kiln, the calcining device including a lower stage constructed as a mixing chamber for waste gas from the rotary kiln and a klinker cooler, and an upper stage constructed as a calcining chamber having means for supplying raw dust or powder thereto, the calcining chamber having outlet means comprising a plurality of discharge channels.

4 Claims, 5 Drawing Figures

HEAT EXCHANGER WITH PRELIMINARY CALCINING

The invention relates to a heat exchanger with preliminary calcining or precalcining.

In rotary-klin installations with large throughput capacity (3,000 to 10,000 tons per hour), heat exchangers with a precalcining device for raw dust or powder of cement, ore or the like are generally installed at present for klinker combustion. The rotary kilns can consequently have about 30% smaller dimensions, which results in lower capital investment costs and also to reduce space requirements. Due to the reduced thermal stresses of the rotary kiln, the durability of the kiln lining is extended so that lower maintenance costs occur. In contrast thereto, the capital investment expenses for the heat exchanger are higher if almost 60% of the entire fuel requirement for the klinker combustion is fed to the heat exchanger for the precalcining of the raw dust or powder. This high share of fuel demands an additional precalcining chamber, which is formed as combustion and mixing chamber for the waste gas from the rotary kiln and from the klinker cooler. The installation of the precalcining chamber, which is not insignificant in dimension, especially when large klinker outputs are involved, and occasioned by the so-called two-strand system in the heat exchanger, even two precalcining chambers results in great construction costs for the heat-exchanger tower as well as additional pressure losses, also, which are associated with higher energy requirement.

It is also disadvantageous that with rotary-kiln installations with a heat exchanger with precalcining, the kiln output cannot be doubled except by the installation of a precalcining chamber; in fact and quite to the contrary, the heat exchanger must be replaced or supplemented by the installation of a second heat exchanger.

It is accordingly an object of the invention to provide a heat exchanger with preliminary calcining or precalcining equipment which has been simplified and rendered more economical with respect to the construction and enlargement thereof.

With the foregoing and other objects in view, there is provided, in accordance with the invention, an heat exchanger for rotary kiln installations wherein cement klinker or the like is burned and wherein precalcining of raw dust or powder is effected in the heat exchanger through supplying fuel thereto, comprising a calcining device connectible in a riser pipeline extending from a rotary kiln to the heat exchanger directly above an inlet head of the rotary kiln, the calcining device including a lower stage constructed as a mixing chamber for waste gas from the rotary kiln and a klinker cooler, and an upper stage constructed as a calcining chamber having means for supplying raw dust or powder thereto, the calcining chamber having outlet means comprising a plurality of discharge channels.

Thus, in accordance with the invention, the riser pipeline from the rotary kiln to the heat exchanger is built into a precalcining chamber. Construction costs, especially, as well as energy costs are thereby economized.

In accordance with another feature of the invention, the mixing chamber is formed with tangentially disposed inlet unions for the waste gas from the klinker cooler.

In accordance with a further feature of the invention, the heat exchanger includes a third stage comprising a cyclone having more than two inlet unions connected tangentially thereto.

In accordance with an added feature of the invention, the heat exchanger includes burners of the fuel disposed tangentially to at least one of the mixing and calcining chambers.

In accordance with a concomitant feature of the invention, yet another cyclone stage having inlet unions is located above and connected to the third stage cyclone, two inlet unions, respectively, of the other cyclone stage, the third cyclone stage and the upper stage being blind-flanged for converting the heat exchanger with precalcining to a heat exchanger without precalcining. The thus formed heat exchanger without precalcining can, in a subsequent production expansion, without giving up the advantage of lower construction costs, be enlarged by the supplementation of cyclones to increase the output thereof by 100%.

Other features which are considered as characteristic for the invention are set forth in the appended claims.

Although the invention is illustrated and described herein as embodied in heat exchanger with preliminary calcining, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
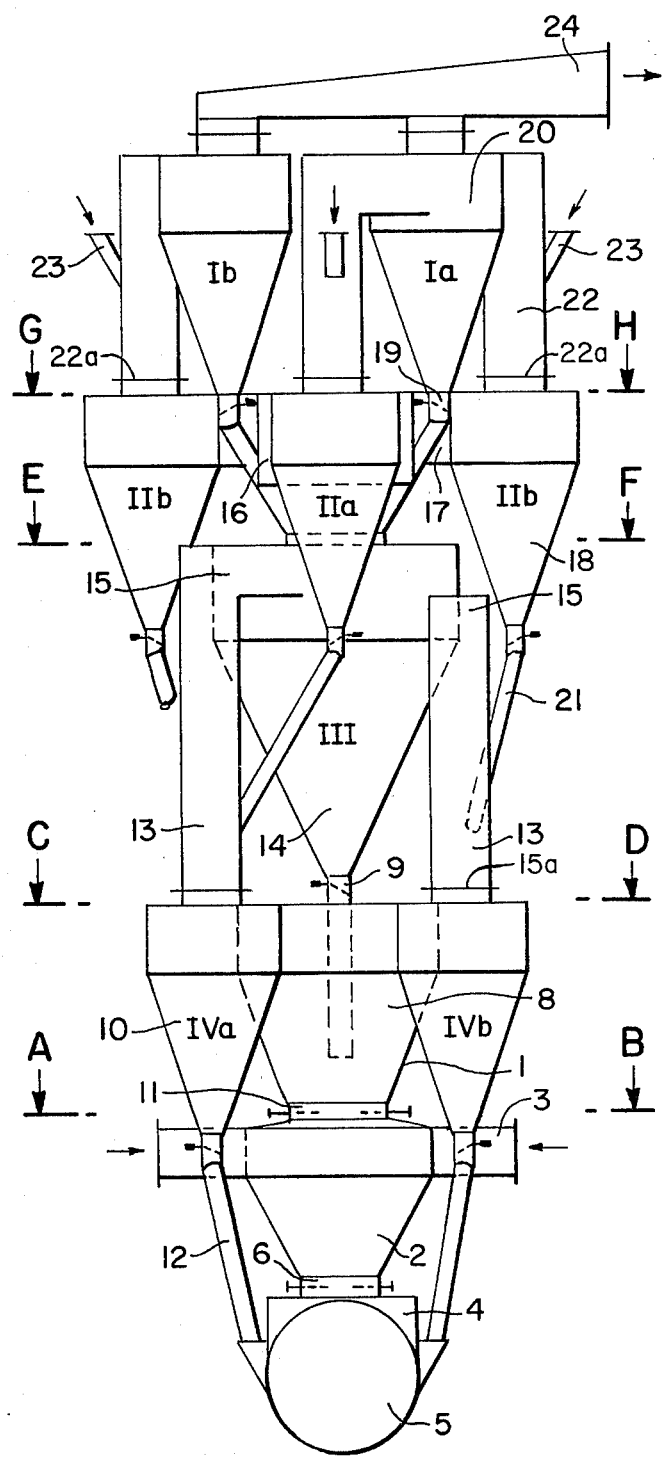
FIG. 1 is a diagrammatic elevational view of a heat exchanger with precalcining device constructed in accordance with the invention.

Referring now to the drawing and first, particularly, to FIG. 1 thereof, there is shown a precalcining device 1 for heated raw cement or ore dust or powder or the like from a heat exchanger. The precalcining device 1 includes a mixing chamber 2 with one or preferably two inlet connecting pieces or unions 3 connected tangentially thereto for waste gas from a klinker cooler 3a. The mixing chamber 2 is disposed directly above a rotary kiln 5. Between the mixing chamber 2 and an inlet head 4 of the rotary kiln 5, suitable means for reducing the cross-sectional area 6 of flow therethrough, such as a butterfly valve or the like, are provided for controlling thereby negative pressure in the rotary kiln 5.

Figure 2:
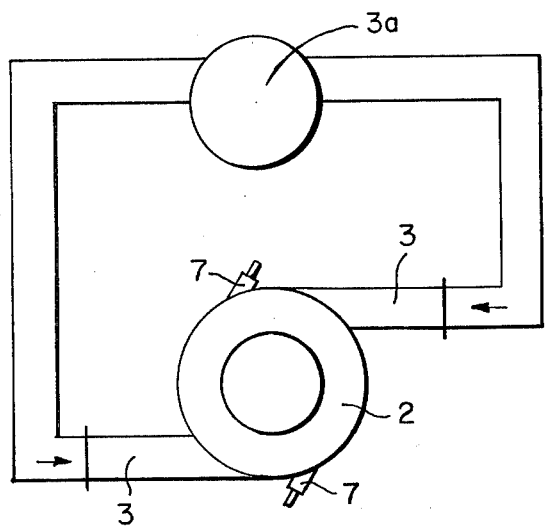
FIG. 2 is a diagrammatic cross-sectional view of FIG. 1 taken along the line A-B in direction of the arrows.

In the cross-sectional view of FIG. 2, burners 7 for gas, oil, coal and the like disposed tangentially to the mixing chamber 2 are shown. An intensive intermixture of fuel and waste gas in the same flow directions is thereby achieved. Due to the tangential inflow of waste gas through the tangential inlet unions 3 from the klinker cooler 3a, in addition to the intensive intermixing of gas and fuel, a high centrifugal motion with dust settling or deposition is effected for the rotary-kiln and klinker waste gas.

As seen in FIG. 1, a precalcining chamber 8 is located above the mixing chamber 2, the raw dust or powder being delivered thereto from a stage III through a downpipe 9. Due to the tangential gas feed through one of the inlet unions 3 into the mixing chamber 2, and due to the tangential gas discharge from the precalcining chamber 8 into a cyclone 10 of a fourth stage IVa, IVb, the duration of heat exchange between the heated gas and the raw dust or powder, due to the centrifugal motion, is increased. By varying the cross section 11 between the mixing chamber 2 and the precalcining chamber 8, the raw dust or powder can be prevented from shooting through into the mixing chamber 2 therebelow, and also the time spent by the raw dust or powder in the precalcining chamber can be controlled or influenced.

Figure 3:
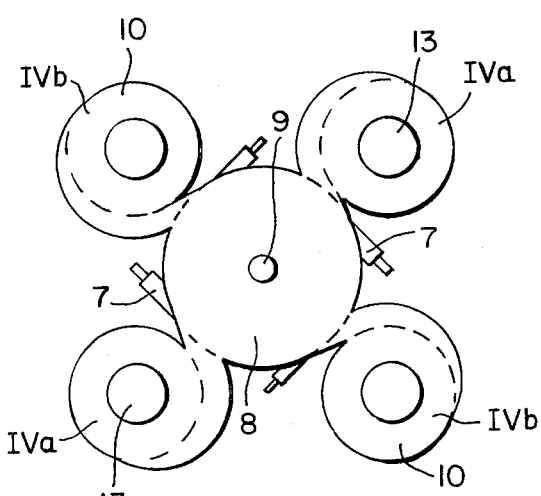
FIG. 3 is a diagrammatic cross-sectional view of FIG. 1 taken along the line C-D in direction of the arrows.

As shown in FIG. 3, burners 7 at the precalcining chamber 8 are also disposed tangentially thereto in flow direction. The deposited raw dust or powder from the cyclones 10 is delivered through down pipelines 12 (FIG. 1), which are provided with diagrammatically illustrated swinging or oscillating flaps or vanes, to the kiln inlet head 4 of the rotary kiln 5.

Figure 4:
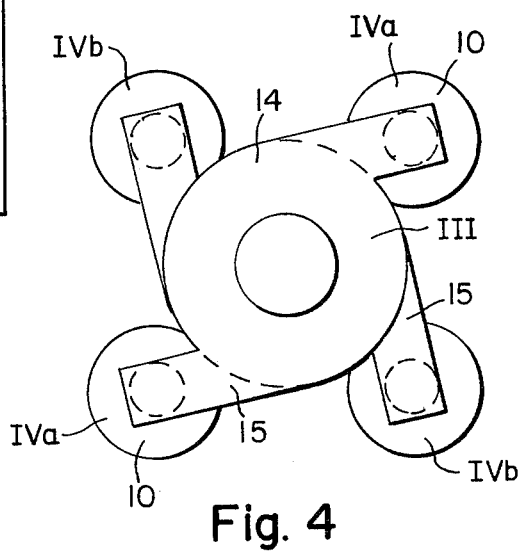
FIG. 4 is a diagrammatic cross-sectional view of FIG. 1 taken along the line E-F in direction of the arrows.

The waste gas from the cyclones 10 is fed through riser pipe-lines 13 with the raw dust or powder out of stage II to a cyclone 14 of the stage III for deposition. This cyclone 14 has four inlet unions 15, as seen in FIG. 4, disposed at elevations mutually offset at the upper part of the cyclone 14. An improved inflow into the cyclone 14, combined with an improved dustdeposition, is thereby attained. In the event that the heat exchanger should be operated without precalcining, for the time being, for selling reasons, two inlet unions 15 are flanged-on blind, i.e. blocked off by a flange, and the respective cyclones IVb, IIb and Ib are not installed. This is done if cyclone IVb is not installed but the apparatus made ready to receive it when needed. In this event flange 15a blocks off union 15, and connecting piping 12 as well as tangential gas discharge from chamber 8 into cyclone IV are not connected. Similarly, when cyclone IIb is omitted then a flange 22a blocks off gas line 22 and tangential inlet 17 to cyclone IIb is blocked off by flange 17b. Piping 21 is not connected. The same procedure is followed when cyclone 1b is not installed. Upon an expansion of production of about 100%, the omitted cyclones IVb, IIb and Ib can be connected with the respective pipelines thereof without having to give up the advantage of the lower construction costs.

Figure 5:
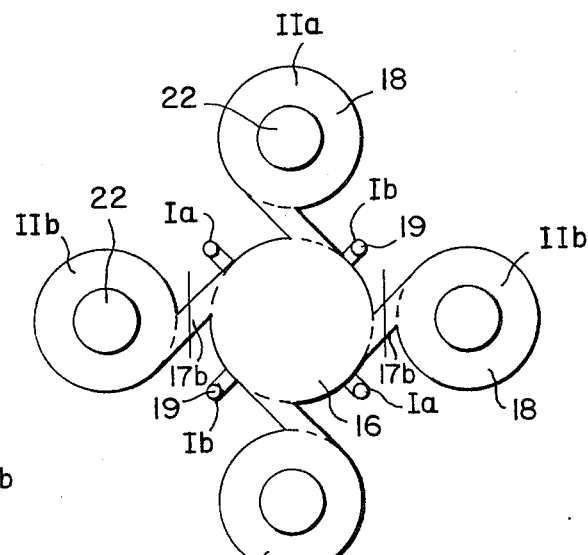
FIG. 5 is a diagrammatic cross-sectional view of FIG. 1 taken along the line G-H in direction of the arrows.

The waste gases of the stage III travel into a vortex vessel 16, as shown in FIGS. 1 and 5, which is disposed above the cyclone 14. From the vortex vessel 16, the waste gases are then fed through connecting pipelines 17 to cyclones 18 of a stage II. The raw dust or powder is delivered into the vortex vessel 16 through down pipelines 19 with swing or oscillating flaps from cyclones 20 of a stage I. The deposited raw dust or powder from the cyclones 18 of the stage II is fed through downpipes 21 to the gas lines 13. The waste gas from the cyclones 18 is delivered through a gas line 22 into the cyclone 20 of the stage I. The raw dust or powder is supplied through supply unions 23 with non-illustrated cell-locks into the gas pipelines 22. From the cyclones 20, the waste gases are conducted through connecting pipelines 24 to one or even two non-illustrated blowers or fans.

There are claimed:

1. Heat exchanger for rotary kiln installations wherein cement klinker or the like is burned and wherein precalcining of raw dust or powder is effected in the heat exchanger through supplying fuel thereto, comprising a preheater for preheating the raw dust or powder having a plurality of interconnected cyclones at different elevations with introduction of raw dust or powder into a cyclone of higher elevation and flow of the raw dust or powder in contact with hot gases issuing from a rotary kiln having an inlet head for the introduction of the preheated dust or powder and an outlet for the discharge of klinker, a calcining device having as a lower stage mixing chamber and an upper stage calcining chamber, burner means for the introduction of fuel to the calcining device, a cooler for cooling klinker from the rotary kiln, said calcining device connected in a riser pipeline extending from the rotary kiln to the preheater directly above the inlet head of the rotary kiln, said calcining device including said lower stage constructed as a vertical mixing chamber with its lower open end disposed directly above the inlet head of the rotary kiln, means for varying the cross-sectional area of flow between the mixing chamber and the inlet head for waste gas from the rotary kiln and with tangentially disposed inlet unions for waste gas from the klinker cooler, and an upper stage constructed as a calcining chamber having means for supplying raw dust or powder thereto disposed above and in open communication with the mixing chamber, means for varying the cross-sectional area between the calcining chamber and mixing chamber to control flow of dust therethrough, said calcining chamber having outlet means comprising a plurality of tangentially disposed discharge channels for the discharge of gas into a plurality of cyclones.

2. Apparatus according to claim 1 wherein said preheater has a first cyclone having more than two inlet unions connected tangentially thereto disposed above said calcining chamber with a downpipe from the first cyclone extending into the bottom half of the calcining chamber delivering dust or powder thereto, and conduit means for passing waste gas from said discharge channels of the calcining chamber to said inlet unions of said cyclone.

3. Apparatus according to claim 1, wherein said calcining device has burners of the fuel placed in tangentially disposed inlet unions formed with at least one of said mixing and calcining chambers.

4. Heat exchanger according to claim 3 including a second cyclone having more than two inlet unions for introduction of dust or powder, said second cyclone located above and connected to said first cyclone for upward flow of waste gas from the first cyclone to the second cyclone, said second cyclone having outlet means for waste gas comprising more than two discharge channels with each discharge channel leading to a respective third cyclone, flanges blocking two said inlet unions of said third cyclones and said first cyclone to enable converting the heat exchanger without precalcining to a heat exchanger with precalcining.

* * * * *